United States Patent
Cattron et al.

(10) Patent No.: US 7,226,958 B2
(45) Date of Patent: Jun. 5, 2007

(54) URETHANE-ACRYLIC COATINGS FOR OPTICAL FIBER

(75) Inventors: Wendell W Cattron, Iron Station, NC (US); Xiaosong Wu, Gastonia, NC (US)

(73) Assignee: DSM IP Assets B.V., Te Heerlen (NL)

( * ) Notice: Subject to any disclaimer, the term of this patent is extended or adjusted under 35 U.S.C. 154(b) by 130 days.

(21) Appl. No.: 10/042,382

(22) Filed: Jan. 11, 2002

(65) Prior Publication Data

US 2002/0161154 A1 Oct. 31, 2002

Related U.S. Application Data

(60) Provisional application No. 60/260,915, filed on Jan. 12, 2001.

(51) Int. Cl.
*C08F 20/20* (2006.01)
*C08F 26/02* (2006.01)
*C08J 3/28* (2006.01)
*C08L 75/16* (2006.01)
*C09D 175/16* (2006.01)

(52) U.S. Cl. .................. 522/96; 522/174; 525/123; 525/454; 525/455; 526/301; 358/901.1; 385/147

(58) Field of Classification Search .................. 522/96, 522/174; 525/123, 454, 455; 526/301; 358/901.1; 385/147
See application file for complete search history.

(56) References Cited

U.S. PATENT DOCUMENTS

| | | | | |
|---|---|---|---|---|
| 5,837,750 | A | * 11/1998 | Szum et al. | ................... 522/81 |
| 6,023,547 | A | * 2/2000 | Tortorello | ................... 385/114 |
| 6,030,606 | A | 2/2000 | Holmes | ...................... 424/49 |
| 2002/0058146 | A1 | * 5/2002 | Schwalm et al. | ........ 428/423.1 |

FOREIGN PATENT DOCUMENTS

| | | |
|---|---|---|
| EP | 831 372 | 3/1998 |
| EP | 995 421 | 4/2000 |
| FR | 2 728 576 | 6/1996 |
| WO | 96 28396 | 9/1996 |

* cited by examiner

*Primary Examiner*—Rabon Sergent
(74) *Attorney, Agent, or Firm*—Nixon & Vanderhye, P.C.

(57) ABSTRACT

The present invention relates to a method of improving the tensile, elongation, and/or modulus (overall toughness) of a radiation curable composition by reacting in a free multifunctional isocyanate prior to curing. Also, radiation-curable compositions are provided that include (i) a component represented by the following formula (a):

(a)     $A-X_1-A$
wherein A represents a (meth)acrylate group; and
$X_1$ represents an aliphatic or aromatic group; and (ii) a urethane (meth)acrylate component comprising a (meth)acrylate group, said $X_1$, and
in addition a residue of a multifunctional isocyanate.

18 Claims, No Drawings

URETHANE-ACRYLIC COATINGS FOR OPTICAL FIBER

This application claims the benefit of U.S. Provisional Application No. 60/260,915, filed Jan. 12, 2001 which is hereby incorporated in its entirety by reference.

FIELD OF THE INVENTION

The present invention relates, inter alia, to fiber optic coating compositions having improved toughness. Furthermore, the present invention relates to a method of improving the tensile, modulus, and/or elongation of a radiation curable coating composition by adding a free isocyanate.

BACKGROUND OF THE INVENTION

In the production of optical fibers, a resin coating is applied immediately after drawing of the glass fibers for protection and reinforcement of the glass fiber. Generally, two coatings are applied, a soft primary coating layer of a flexible resin (low modulus and low Tg) which is coated directly on the glass surface and a secondary coating layer of a rigid resin (higher modulus and higher Tg) which is provided over the primary coating layer. Often, for identification purposes, the fibers will be colored. Accordingly, the fibers may further be coated with an ink, which generally is a curable resin comprising a colorant (such as a pigment and/or a dye), or the secondary coating may be a colored secondary coating (i.e, comprise a colorant).

Several coated (and optionally inked) optical fibers can be bundled together to form a so-called optical fiber ribbon, e.g., four or eight coated (and optionally inked) optical fibers are arranged on a plane and secured with a binder to produce a ribbon structure having a rectangular cross section. Said binder material for binding several optical fibers to produce the optical fiber ribbon structure is called a ribbon matrix material. In addition, a material for the further binding of several optical fiber ribbons to produce multi-core optical fiber ribbons is called a bundling material.

Resins that cure on exposure to radiation such as ultraviolet radiation are favored in the industry, due to their fast cure, enabling the coated fiber to be produced at high speed. In many of these radiation curable resin compositions, use is made of urethane oligomers having reactive terminal groups (such as an acrylate or methacrylate functionality, herein referred to as (meth)acrylate functionality) and a polymer backbone. Generally, these compositions may further comprise reactive diluents, photoinitiators, and optionally suitable additives.

It is a continual objective of the industry to improve the performance of the coatings. Among the many performance characteristics required of the coating systems, the tensile strength, modulus and elongation are important. Accordingly, formulators add components to the composition to manipulate these characteristics.

The applicants have discovered that they can introduce a free multi-functional isocyanate either directly mixed with the multi-functional acrylate or into the final composition, prior to curing, and thereby improve tensile, elongation, and/or modulus properties in the composition. Applicants have furthermore discovered that the addition of relatively small amounts of aromatic urethane acrylate components can also give improved mechanical properties.

SUMMARY OF THE INVENTION

The present invention provides a method of improving the tensile, elongation, and/or modulus (overall toughness) of a radiation curable composition by reacting in a free multifunctional isocyanate prior to curing.

The present invention further provides a method of improving the tensile, elongation, and/or modulus (overall toughness) of a radiation curable composition by having relative small amounts aromatic urethane acrylate components present.

In addition, the present invention provides compositions comprising
(i) a component according to the following formula (a)

$$A\text{-}X_1\text{-}A \qquad (a)$$

wherein
A represents a (meth)acrylate group; and
$X_1$ represents an aliphatic or aromatic group; and
(ii) a urethane (meth)acrylate component comprising a (meth)acrylate group, $X_1$, and a residue of a multifunctional isocyanate.

The inventors have found, that the components as supplied by raw material manufacturers, often comprise undesired by-products or side-products ("impurities"), which may lessen one or more of the effects the components are supposed to accomplish. For instance, multi-functional acrylate components (such as ethoxylated Bisphenol A diacrylate) often are inclusive of minor amounts of monofunctional acrylates (such as ethoxylated Bisphenol A mono acrylate) which effect the overall performance properties of the coatings. The present invention comprises the step of converting at least a portion of the mono-functional components to multi-functional components, and therewith improve properties.

DETAILED DESCRIPTION OF THE PRESENT INVENTION

Multi-functional refers to a compound having at least two functional groups. For example, multi-functional acrylate or multi-functional isocyanate refers to an acrylate or an isocyanate compound having at least 2, preferably 2-3, acrylate or isocyanate groups, respectively.

The radiation-curable composition of present invention may be formulated using any suitable components and processes used for such purposes. Typcially, the coatings will be (meth)acrylate radiation curable compositions preferably having, relative to the total weight of the composition, more than 90% acrylate-functional components.

The radiation curable composition preferably comprises a radiation curable oligomer and a radiation curable diluent. Each of the components may be mono or polyfunctional, poly meaning 2 or more functional. Generally, the functionality of the radiation curable components is 12 or lower. Preferred functionality for at least one of the components is on average 1.8-4.

The terms diluent and oligomer are used in this specification to denote a compound with lower, respectively, higher viscosity. The oligomer generally will have a molecular weight of about 400 or higher and an average functionality of about 1.2 or higher, preferably an average functionality of about 1.8-4.

The reactive diluent has a viscosity that is lower than the viscosity of the oligomer. In case an oligomer is used with high viscosity, the diluent may have a molecular weight up to about 700.

(A) Oligomer

Generally, optical fiber coating materials comprise as an oligomer a urethane acrylate oligomer, comprising an acrylate group, urethane groups and a backbone. The backbone is derived from a polyol which has been reacted with a diisocyanate and hydroxyalkylacrylate. However, urethane-free ethylenically unsaturated oligomers such as polyester acrylates may also be used.

Examples of suitable polyols are polyether polyols, polyester polyols, polycarbonate polyols, polycaprolactone polyols, acrylic polyols, and other polyols. These polyols may be used either individually or in combinations of two or more. There are no specific limitations to the manner of polymerization of the structural units in these polyols. Any of random polymerization, block polymerization, or graft polymerization is acceptable.

Given as examples of the polyether polyols are polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG#1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. Specifically, polyols containing polytetramethylene glycol and copolymer glycols of butyleneoxide and ethyleneoxide are particularly preferred.

The reduced number average molecular weight derived from the hydroxyl number of these polyols is usually from about 50 to about 15,000, and preferably from about 1,000 to about 8,000.

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred polyisocyanates are isophorone diisocyanate, 2,2,4-trimethylhexamethylene diisocyanate, 2,4-tolylene diisocyanate, and 2,6-tolylene diisocyanate.

Examples of the hydroxyl group-containing (meth)acrylate used in the oligomer, include, (meth)acrylates derived from (meth)acrylic acid and epoxy and (meth)acrylates comprising alkylene oxides, more in particular, 2-hydroxy ethyl (meth)acrylate, 2-hydroxypropylacrylate and 2-hydroxy-3-oxyphenyl(meth)acrylate. Acrylate functional groups are preferred over methacrylates.

The ratio of polyol, polyisocyanate, and hydroxyl group-containing (meth)acrylate used for preparing the urethane (meth)acrylate is determined so that about 1.1 to about 3 equivalents of an isocyanate group included in the polyisocyanate and about 0.1 to about 1.5 equivalents of a hydroxyl group included in the hydroxyl group-containing (meth)acrylate are used for one equivalent of the hydroxyl group included in the glycol.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from about 0.01 to about 1 wt % of the total amount of the reactant. The reaction is carried out at a temperature from about 10 to about 90° C., and preferably from about 30 to about 80° C.

The number average molecular weight of the urethane (meth)acrylate used in the composition of the present invention is preferably in about 500 or higher, more preferably 800 or higher, and particularly preferred 1,200 g/mol or higher. Generally, the molecular weight is about 20,000 g/mol or lower, and more preferably about 10,000 g/mol or lower. If the number average molecular weight of the urethane (meth)acrylate is less than about 100 g/mol, the resin composition tends to solidify; on the other hand, if the number average molecular weight is larger than about 20,000 g/mol, the viscosity of the composition becomes high, making handling of the composition difficult. Particularly preferred for outer primary coatings inks or matrix materials are oligomers having a number average molecular weight between about 800 and about 4,000 g/mol.

The urethane (meth)acrylate is used in an amount of 5% or more, preferably from about 10 wt % or more, and more preferably from about 20 wt % or more, of the total amount of the resin composition. Generally, the amount of urethane (meth)acrylate oligomer is about 90% or less, preferably about 80 wt % or less. When the composition is used as a coating material for optical fibers, the range from about 20 to about 80 wt % is particularly preferable to ensure excellent coatability, as well as superior flexibility and long-term reliability of the cured coating.

Other oligomers that can be used include polyester (meth)acrylate, epoxy (meth)acrylate, polyamide (meth)acrylate, siloxane polymer having a (meth)acryloyloxy group, a reactive polymer obtained by reacting (meth)acrylic acid and a copolymer of glycidyl methacrylate and other polymerizable monomers, and the like. Particularly preferred are bisphenol A based acrylate oligomers such as alkoxylated bisphenol-A-diacrylate and diglycidyl-bisphenol-A-diacrylate.

Beside the above-described components, other curable oligomers or polymers may be added to the liquid curable resin composition of the present invention to the extent that the characteristics of the liquid curable resin composition are not adversely affected.

Preferred oligomers are polyether based acrylate oligomers, polycarbonate acrylate oligomers, polyester acrylate oligomers, alkyd acrylate oligomers and acrylated acrylic oligomers. More preferred are the urethane-containing oligomers thereof. Even more preferred are polyether urethane acrylate oligomers and urethane acrylate oligomers using blends of the above polyols, and particularly preferred are aliphatic polyether urethane acrylate oligomers. The term "aliphatic" refers to a wholly aliphatic polyisocyanate used. However, also urethane-free acrylate oligomers, such as urethane-free acrylated acrylic oligomers, urethane-free polyester acrylate oligomers and urethane-free alkyd acrylate oligomers are also preferred.

(B) Reactive Diluent

Suitable reactive diluents include those exemplified herein below.

Polymerizable vinyl monomers such as polymerizable monofunctional vinyl monomers containing one polymerizable vinyl group in the molecule and polymerizable polyfunctional vinyl monomers containing two or more polymerizable vinyl groups in the molecule may be added to the liquid curable resin composition of the present invention.

Given as specific examples of the polymerizable monofunctional vinyl monomers are vinyl monomers such as N-vinyl pyrrolidone, N-vinyl caprolactam, vinyl imidazole, and vinyl pyridine; (meth)acrylates containing an alicyclic structure such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate; benzyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl(meth)acrylate, phenoxyethyl(meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypropylene glycol (meth)acrylate, diacetone(meth)acrylamide, isobutoxy methyl(meth)acrylamide, N,N-dimethyl (meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, N,N-dimethyl amino propyl (meth)acrylamide, hydroxy butyl vinyl ether, lauryl vinyl ether, cetyl vinyl ether, 2-ethylhexyl vinyl ether, acrylate monomers shown by the following formulas (1) to (3),

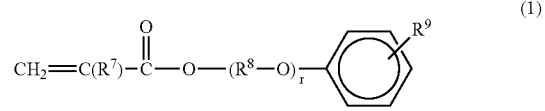

wherein $R^7$ is a hydrogen atom or a methyl group, $R^8$ is an alkylene group having 2-6, and preferably 2-4 carbon atoms, $R^9$ is a hydrogen atom or an organic group containing 1-12 carbon atoms or an aromatic ring, and r is an integer from 0 to 12, and preferably from 1 to 8,

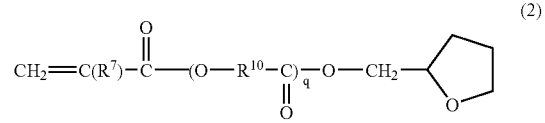

wherein $R^7$ is the same as defined above, $R^{10}$ is an alkylene group having 2-8, and preferably 2-5 carbon atoms, and q is an integer from 1 to 8, and preferably from 1 to 4,

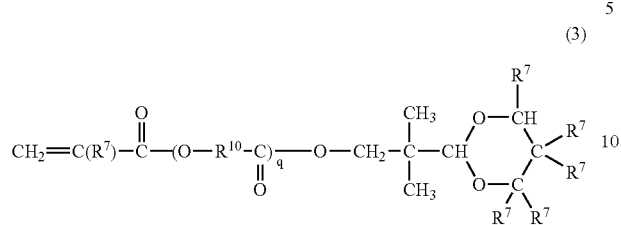

(3)

wherein $R^7$, $R^{10}$, and q are the same as defined above.

As examples of commercially available products of the polymerizable monofunctional vinyl monomers, Aronix M102, M110, M111, M113, M117 (manufactured by Toagosei Co., Ltd.), LA, IBXA, Viscoat #190, #192, #2000 (manufactured by Osaka Organic Chemical Industry Co., Ltd.), Light Acrylate EC-A, PO-A, NP-4EA, NP-8EA, M-600A, HOA-MPL (manufactured by Kyoeisha Chemical Co., Ltd.), KAYARAD TC110S, R629, R644 (manufactured by Nippon Kayaku Co., Ltd.), and the like can be given.

Given as examples of the polymerizable polyfunctional vinyl monomers are the following acrylate compounds: trimethylolpropane tri(meth)acrylate, pentaerythritol tri(meth)acrylate, ethylene glycol di(meth)acrylate, tetraethylene glycol di(meth)acrylate, polyethylene glycol di(meth) acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl) isocyanurate di(meth)acrylate, bis(hydroxymethyl) tricyclodecane di(meth)acrylate, di(meth)acrylate of a diol which is an addition compound of ethylene oxide or propylene oxide to bisphenol A, di(meth)acrylate of a diol which is an addition compound of ethylene oxide or propylene oxide to hydrogenated bisphenol A, epoxy(meth) acrylate obtained by the addition of (meth)acrylate to diglycidyl ether of bisphenol A, diacrylate of polyoxyalkylene bisphenol A, and triethylene glycol divinyl ether.

Examples of commercially available products of the polymerizable polyfunctional vinyl monomers include Yupimer UV SA1002, SA2007 (manufactured by Mitsubishi Chemical Corp.), Viscoat #195, #230, #215, #260, #335HP, #295, #300, #700 (manufactured by Osaka Organic Chemical Industry Co., Ltd.), Light Acrylate 4EG-A, 9EG-A, NP-A, DCP-A, BP-4EA, BP-4PA, PE-3A, PE-4A, DPE-6A (manufactured by Kyoeisha Chemical Co., Ltd.), KAYARAD R-604, DPCA-20,-30,-60,-120, HX-620, D-310, D-330 (manufactured by Nippon Kayaku Co., Ltd.), Aronix M-208, M-210, M-215, M-220, M-240, M-305, M-309, M-315, M-325 (manufactured by Toagosei Co., Ltd.), and the like.

These polymerizable vinyl monomers are used in an amount from about 10 to about 70 wt %, and preferably from about 15 to about 60 wt %, of the total amount of the resin composition. If the amount is less than about 10 wt %, the viscosity of the composition is so high that coatability is impaired. The amount exceeding about 70 wt % may result in not only an increased cure shrinkage, but also insufficient toughness of the cured products.

Preferred reactive diluents include alkoxylated alkyl substituted phenol acrylate, such as ethoxylated nonyl phenol acrylate, vinyl monomers such as vinyl caprolactam, isodecyl acrylate, and alkoxylated bisphenol A diacrylate such as ethoxylated bisphenol A diacrylate.

(C) Specific Combination of Components

Preferably, the present compositions comprise:

(i) a component represented by the following formula (a)

$$A\text{-}X_1\text{-}A \quad (a)$$

wherein

A represents a (meth)acrylate group, preferably an acrylate group; and $X_1$ represents an aliphatic or aromatic group, preferably having a molecular weight below 750, more preferably below 500, most preferably less than 350 g/mol; and (ii) a urethane (meth)acrylate component comprising a (metha)acrylate group (preferably an acrylate group), $X_1$, and a residue of a multifunctional isocyanate (preferably a residue of a diisocyanate).

Component (ii) may be a urethane (meth)acrylate component represented by the following formula (b):

$$X_2\text{-}I\text{-}X_2 \quad (b)$$

wherein I represents a diisocyanate residue and $X_2$ represents a residue of a component represented by the following formula (c):

$$A\text{-}X_1\text{-}OH \quad (c).$$

Accordingly, $X_2$ represents a residue of a hydroxyfunctional (meth)acrylate.

Preferably $X_1$ comprises one or more aromatic rings, preferably 2 aromatic rings. The one or more aromatic rings are preferably present in $X_1$ as phenolic residues. It is also preferred that $X_1$ comprises one or more alkoxy groups (e.g. 1-20, 1-10, or 2-6 alkoxy groups), for instance ethoxy and/or propoxy groups.

Preferably, A-$X_1$-A represents a bisphenol diacrylate, for instance a bisphenol A diacrylate such as an alkoxylated (e.g. ethoxylated and/or propoxylated) bisphenol A diacrylate.

Component (ii) may be prepared by reacting at least part of the hydroxyfunctional side-products, that may be present in a sample of A-$X_1$-A, with one or more suitable diisocyanates. Therewith, hydroxyfunctional impurities (side products) can be converted into difunctional components. This conversion may be done in situ, i.e. by simply adding diisocyanate to a composition comprising several components, one of which being a component represented by A-$X_1$-A. The conversion may also be effected by first adding diisocyanate to a sample of A-$X_1$-A, reacting diisocyanate with hydroxyfunctional impurities present in the sample, and then adding the sample to the composition.

Suitable diisocyanates include, for example 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred polyisocyanates include aromatic isocyanates, particularly tolylene diisocyanates.

(D) Photoinitiator

When the liquid curable resin composition of the present invention is cured by radiation, a photo-polymerization initiator is used.

In a preferred embodiment of the present invention, the photoinitiators (Ci) are free radical photoinitiators.

Free-radical photoinitiators are generally divided into two classes according to the process by which the initiating radicals are formed. Compounds that undergo unimolecular bond cleavage upon irradiation are termed Type I or homolytic photoinitiators, as shown by formula (1):

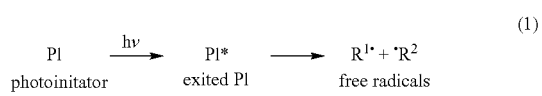
(1)

Depending on the nature of the functional group and its location in the molecule relative to the carbonyl group, the fragmentation can take place at a bond adjacent to the carbonyl group (α-cleavage), at a bond in the β-position (β-cleavage) or, in the case of particularly weak bonds (like C—S bonds or O—O bonds), elsewhere at a remote position. By far the most important fragmentation in photoinitiator molecules is the α-cleavage of the carbon-carbon bond between the carbonyl group and the alkyl residue in alkyl aryl ketones which is known as the Norrish Type I reaction.

If the excited state photoinitiator interacts with a second molecule (a coinitiator COI) to generate radicals in a bimolecular reaction as shown by formula (2), the initiating system is termed a Type II photoinitiator. In general, the two main reaction pathways for Type II photoinitiators are hydrogen abstraction by the excited initiator or photoinduced electron transfer, followed by fragmentation. Bimolecular hydrogen abstraction is a typical reaction of diaryl ketones. Photoinduced electron transfer is a more general process which is not limited to a certain class of compounds.

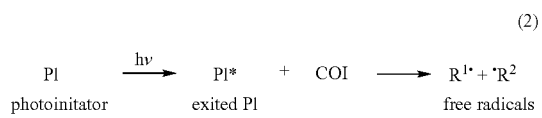
(2)

Examples of suitable Type I homolytic free-radical photoinitiators are benzoin derivatives, methylolbenzoin and 4-benzoyl-1,3-dioxolane derivatives, benzilketals, α,α-dialkoxyacetophenones, α-hydroxy alkylphenones, α-aminoalkylphenones, acylphosphine oxides, bisacylphosphine oxides, acylphosphine sulphides, halogenated acetophenone derivatives, and the like. Commercial examples of suitable Type I photoinitiators are Irgacure 651 (benzildimethyl ketal or 2,2-dimethoxy-1,2-diphenylethanone, Ciba-Geigy), Irgacure 184 (1-hydroxy-cyclohexyl-phenyl ketone as the active component, Ciba-Geigy), Darocur 1173 (2-hydroxy-2-methyl-1-phenylpropan-1-one as the active component, Ciba-Geigy), Irgacure 907 (2-methyl-1-[4-(methylthio)phenyl]-2-morpholino propan-1-one, Ciba-Geigy), Irgacure 369 (2-benzyl-2-dimethylamino-1-(4-morpholinophenyl)-butan-1-one as the active component, Ciba-Geigy), Esacure KIP 150 (poly {2-hydroxy-2-methyl-1-[4-(1-methylvinyl)phenyl]propan-1-one}, Fratelli Lamberti), Esacure KIP 100 F (blend of poly {2-hydroxy-2-methyl-1-[4-(1-methylvinyl) phenyl]propan-1-one} and 2-hydroxy-2-methyl-1-phenyl-propan-1-one, Fratelli Lamberti), Esacure KTO 46 (blend of poly {2-hydroxy-2-methyl-1-[4-(1-methylvinyl)phenyl]propan-1-one}, 2,4,6-trimethylbenzoyldiphenylphosphine oxide and methylbenzophenone derivatives, Fratelli Lamberti), acylphosphine oxides such as Lucirin TPO (2,4,6-trimethylbenzoyl diphenyl phosphine oxide, BASF), Irgacure 819 (bis (2,4,6-trimethylbenzoyl)-phenyl-phosphine-oxide, Ciba-Geigy), Irgacure 1700 (25:75% blend of bis (2,6-dimethoxybenzoyl)2,4,4-trimethylpentyl phosphine oxide and 2-hydroxy-2-methyl-1-phenyl-propan-1-one, Ciba-Geigy), and the like. Also mixtures of type I photoinitiators can be used. For colored (e.g. pigmented) systems, phosphine oxide type photoinitiators and Irgacure 907 are preferred.

Examples of suitable Type-II (hydrogen abstraction) photoinitiators are aromatic ketones such as benzophenone, xanthone, derivatives of benzophenone (e.g. chlorobenzophenone), blends of benzophenone and benzophenone derivatives (e.g. Photocure 81, a 50/50 blend of 4-methylbenzophenone and benzophenone), Michler's Ketone, Ethyl Michler's Ketone, thioxanthone and other xanthone derivatives like Quantacure ITX (isopropyl thioxanthone), benzil, anthraquinones (e.g. 2-ethyl anthraquinone), coumarin, and the like. Chemical derivatives and combinations of these photoinitiators can also be used.

Type-II photoinitiators generally are used together with an amine synergist. Preferably, the amine synergist is chosen from the group consisting of a monomer tertiary amine compound, an oligomer (polymer) tertiary amine compound, a polymerizable amino acrylate compound, a polymerized amino acrylate compound and mixtures thereof.

The amine-synergist may include tertiary amine compounds, such as alkanol-dialkylamines (e.g., ethanol-diethylamine), alkyldialkanolamines (e.g. methyldiethanolamine), trialkanolamines (e.g. triethanolamine), and ethylenically unsaturated amine-functional compounds including amine-functional polymer compounds, copolymerizable amine acrylates, and the like. The ethylenically unsaturated amine compounds may also include dialkylamino alkyl(meth)acrylates (e.g., diethylaminoethylacrylate) or N-morpholinoalkyl-(meth)acrylates (e.g., N-morpholinoethyl-acrylate).

Preferably, the total amount of photoinitiators present is between about 0.10 wt. % and about 20.0 wt. % relative to the total amount of the coating composition. More preferably, the total amount is at least about 0.5 wt. %, particularly preferred, at least about 1.0 wt. %, and most preferred, at least about 2.0 wt. %. Moreover, the total amount is preferably less than about 15.0 wt. %, more preferably, less than about 10.0 wt. %, and particularly preferred, less than about 6.0 wt. %

Preferably, each of the photoinitiators (Ci) is individually present in an amount of at least about 0.02 wt. %, more preferably, at least about 0.05 wt. %, particularly preferred, at least about 0.1 wt. %, and most preferred, at least about 0.15 wt. %. Further, each photoinitiator (Ci) is individually preferably present in an amount of about 10.0 wt. % or less, more preferably, about 5.0 wt. % or less, particularly preferably, about 4.0 wt. % or less, and most preferred, about 2.5 wt. % or less.

The ratio $C_i:C$ of the amount of individual photoinitiator (Ci) to the total amount of photoinitiators (C) preferably is about 50% or less, more preferably about 45% or less, particularly preferred about 40% or less, most preferred about 30% or less. The ratio $C_i:C$ preferably is at least about 2%, more preferably at least about 5%, particularly preferred at least about 10%.

It is preferred that at least two of the compounds (Ci) are homolytic free radical photoinitiators, preferably, at least three, more preferably, at least four, particularly preferred all the compounds (Ci) are homolytic free radical photoinitiators. Moreover, it is preferred that at least two of the compounds (Ci) are α-cleavage homolytic free radical photoinitiators, more preferred, at least three, particularly preferred at least four and most preferred, all of the compounds (Ci) are of the α-cleavage type.

In one preferred embodiment of the present invention at least one of the photoinitiators contains a phosphorous, sulfur or nitrogen atom. It is even more preferred that the photoinitiator package comprises at least a combination of a photoinitiator containing a phosphorous atom and a photoinitiator containing a sulfur atom.

In another preferred embodiment of the invention, at least one of the compounds (Ci) is an oligomeric or polymeric photoinitiator. Besides showing an improved cure speed, said coating compositions comprising at least one polymeric photoinitiator (Ci) additionally exhibit, upon cure, improved release properties from another covering layer, such as a matrix or bundling material or any other material applied to the surface of the subject composition.

The oligomeric photoinitiator can include Esacure KIP 100F, available form Sartomer Corporation.

(E) Additives

An amine compound can be added to the liquid curable resin composition of the present invention to prevent generation of hydrogen gas, which causes transmission loss in the optical fibers. As examples of the amine which can be used here, diallylamine, diisopropylamine, diethylamine, diethylhexylamine, and the like can be given.

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. Examples of antioxidants include Irganox 1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like; examples of silane coupling agents include aminopropyltriethoxysilane, mercaptopropyltrimethoxy-silane, and methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.); examples of coating surface improvers include silicone additives such as dimethylsiloxane polyether and commercially available products such as DC-57, DC-190 (manufactured by Dow- Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), and L-700, L-7002, L-7500, FK-024-90 (manufactured by Nippon Unicar Co., Ltd.).

The description on radiation curable compositions can also apply to colored compositions, being either a colored single, inner primary, or outer primary composition, an ink composition or a colored matrix or bundling material. The colorant can be a pigment or dye. The pigment can be any pigment suitable for use in pigmented colored optical fiber coatings. Preferably, the pigment is in the form of small particles and is capable of withstanding UV-radiation.

Pigments can be conventional or organic pigments as disclosed in, for example, *Ullman's Encyclopedia of Industrial Chemistry*, $5^{th}$ Ed., Vol. A22, VCH Publishers (1993), pages 154-155, the complete disclosure of which is hereby fully incorporated by reference. The pigment can be selected based on, for example, whether the composition is a colored secondary, ink coating or matrix material. Ink coatings are typically more heavily pigmented.

General classes of suitable colorants include, among others, inorganic white pigments; black pigments; iron oxides; chromium oxide greens; iron blue and chrome green; violet pigments; ultramarine pigments; blue, green, yellow, and brown metal combinations; lead chromates and lead molybdates; cadmium pigments; titane pigments; pearlescent pigments; metallic pigments; monoazo pigments, diazo pigments; diazo condensation pigments; quinacridone pigments, dioxazine violet pigment; vat pigments; perylene pigments; thioindigo pigments; phthalocyanine pigments; and tetrachloroindolinones; azo dyes; anthraquinone dyes; xanthene dyes; and azine dyes. Fluorescent pigments can also be used.

Preferably, the pigment has a mean particle size of not more than about 1 μm. The particle size of the commercial pigments can be lowered by milling if necessary. The pigment is preferably present in an amount of about 0.1 to about 10% by weight, and more preferably in an amount of about 0.3 to about 8% by weight.

Instead of pigments also dyes can be used if sufficiently color stable. Reactive dyes are particularly preferred. Suitable dyes include polymethine dyes, di and triarylmethine dyes, aza analogues of diarylmethine dyes, aza (18) annulenes (or natural dyes), nitro and nitroso dyes, aza dyes, anthraquinone dyes and sulfur dyes. These dyes are well known in the art.

All these additives may be added to the compositions according to the invention in an amount that is usual for the additive when used in optical fiber coatings.

Physical Characteristics

The viscosity of the liquid curable resin composition of the present invention is usually in the range from about 200 to about 20,000 cps at 25° C., and preferably from about 2,000 to about 15,000.

The radiation curable composition of the present invention may be formulated to be used as a single coating, an inner primary coating, outer primary coating, a matrix material or bundling material (all of which can be colored or not), or as an ink. The invention is particularly suitable for harder materials such as coatings, inks or matrix materials having modulus of about 400 MPa or higher, more preferably 600 MPa or higher and most preferably 800 MPa or higher. In particular, the radiation-curable compositions of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics.

In contrast, suitable compositions for outer primary coatings, inks and matrix materials generally have a modulus of above 50 MPa, with outer primary coatings tending to have a modulus more particularly above 100 up to 2,500 MPa and matrix materials tending to be more particularly between about 50 MPa to about 200 MPa for soft matrix materials, and between 200 to about 2,500 MPa for hard matrix materials. The radiation-curable composition of the present invention may be formulated such that the composition after cure has a Tg between −70° C. and 130° C. The Tg is measured as the peak tan-delta in a DMA curve. Preferably, for harder materials, the Tg is about 40° C. or higher, more preferably, about 60° C. or higher.

Elongation and tensile strength of these materials can also be optimized depending on the design criteria for a particular use. For cured coatings formed from radiation-curable compositions formulated for use as inner primary coatings on optical fibers, the elongation-at-break is typically greater than 65%, preferably greater than 80%, more preferably the elongation-at-break is at least 110%, more preferably at least 150% but not typically higher than 400%. For coatings formulated for outer primary coatings, inks and matrix materials the elongation-at-break is typically between 6% and 100%, and preferably higher than 10%, more preferably about 20% or higher and in particular about 25% or higher.

In one preferred embodiment of the invention, polyfunctional isocyanates are added to the otherwise final coating composition, and the mixture is stirred for obtaining a homogeneous mixture. Hydroxyfunctional components are in this way reacted with each other, and, apparently, this leads to improved mechanical properties.

In another preferred embodiment, specific components know to comprise hydroxyfunctional compounds are reacted with polyfunctional isocyanates, and, thereafter, these components are added to the coating composition. This also gives an improvement in mechanical properties.

In yet another embodiment, the specific components known to comprise hydroxy functional compounds are reacted with a both polyisocyanates and hydroxyfunctional acrylate compounds, so obtaining further oligomeric compounds that yield improved mechanical properties.

A preferred hydroxyfunctional component is alkoxylated bisphenol-A or alkoxylated bisphenol-A-mono acrylate. Polyfunctioal isocyanates and hydroxyfunctional acrylate compounds as described above are particularly useful. Useful amounts of these toughening agents are, for instance, 10 wt % or less, e.g. 5 wt % or less, relative to the total composition. This means that generally 0.2-5% by wt. polyisocyanate is used, preferably 0.3-3% by wt., to achieve the toughening. Preferred applications for the present compositions are in the field of optical fiber coatings, such as, for instance, matrix materials, bundling materials, secondary coatings, colored secondary coatings, and inks.

EXAMPLES

The following examples are given as particular embodiments of the invention and to demonstrate the practice and advantages thereof. The examples are given by way of illustration and are not intended to limit the specification or claims.

Tensile Strength, Elongation, Modulus, and Toughness Test Method

The tensile strength, elongation and secant modulus of cured samples was tested using a universal testing instrument, Instron Model 4201 equipped with a personal computer and software "Series IX Materials Testing System." The load cells used were 2 and 20 pound capacity. The ASTM D638M was followed, with the following modifications.

A drawdown of each material to be tested was made on glass plate or Mylar (in particular, the outer primary coating compositions, unless otherwise noted, were measured on Mylar) and cured using a UV processor. The cured film was conditioned at 22 to 24° C. and 50+5% relative humidity for a minimum of sixteen hours prior to testing.

A minimum of eight test specimens, having a width of 0.5+0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where:
 A=Product's maximum expected tensile strength (MPa);
 145=Conversion Factor from MPa to psi;
 0.00015=approximate cross-sectional area (in$^2$) of test specimens; and
 C=lbs.

The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min (25.4 mm/min), and the crosshead action was set to "return at break". The crosshead was adjusted to 2.00 inches (50.8 mm) jaw separation. The air pressure for the pneumatic grips was turned on and adjusted as follows: set approximately 20 psi (1.5 Kg/cm$^2$) for primary optical fiber coatings and other very soft coatings; set approximately 40 psi (3Kg/cm$^2$) for optical fiber single coats; and set approximately 60 psi (4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23±1.0 C and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and secant, or segment, modulus were checked to determine whether any one of them deviated from the average enough to be an "outlier." If the modulus value was an outlier, it was discarded. If there were less than six data values for the tensile strength, then the entire data set was discarded and repeated using a new plate. The toughness was determined as the area under the stress-strain curve up to the elongation at break.

All recorded values were normalized as shown below.

Examples

These examples illustrate the change observed in various physical properties of the below listed primary coating compositions, wherein an isocyanate is introduced either via a pre-mixture or in situ.

| Outer Primary Coating Composition A (approximate percentages): | |
|---|---|
| Ethoxylated Bisphenol A Diacrylate (SR-349, Sartomer) | 75% |
| Polyether Urethane Oligomer | 20% |
| Ethoxylated Nonylphenol Acrylate (SR-504D, Sartomer) | 5% |
| Hydroxycyclohexyl Phenyl Ketone (Irgacure-184) | ~1% |
| 2,4,6-Trimethylbenzoyl Diphenyl Phosphine Oxide | <1% |
| Thiodiethylene bis (3,5-di-tert-butyl-4-Hydroxy)hydrocinnamate | <1% |
| Outer Primary Coating Composition B (approximate percentages): | |
| Ethoxylated Bisphenol A Diacrylate (SR-349, Sartomer) | 56% |
| Polyether Urethane Oligomer | 33% |
| Ethoxylated Nonylphenol Acrylate (SR-504D, Sartomer) | 6% |
| Hydroxycyclohexyl Phenyl Ketone (Irgacure-184) | 2% |
| 2,4,6-Trimethylbenzoyl Diphenyl Phosphine Oxide | 1% |
| Thiodiethylene bis (3,5-di-tert-butyl-4-Hydroxy) Hydrocinnamate | <1% |
| Pre-Mixture Composition (percent based on weight): | |
| Ethoxylated Bisphenol A Diacrylate (SR-349, Sartomer) | 94.3% |
| Toluene Diisocyanate | 3.7% |
| 2-Hydroxyethyl acrylate | 1.9% |
| Butylated Hydroxy Toluene | 0.08% |
| Dibutyltin Dilaurate | 0.04% |

TABLE 1

Relative Physical Properties of Composition A upon Addition of the Pre-Mixture Composition. Relative means that the lowest value in a category (tensile strength, elongation, modulus, or toughness) is normalized to 1.000, and that the other values are relative thereto.

| | Example | | | | |
|---|---|---|---|---|---|
| | 1 | 2 | 3 | 4 | 5 |
| Composition A/Pre-Mixture (wt/wt) | 100/0.0 | 97.5/2.5 | 95/5.0 | 92.5/7.5 | 90/10.0 |
| Relative Tensile Strength | 1.105 | 1.234 | 1.230 | 1.000 | 1.054 |
| Relative Elongation | 1.288 | 1.494 | 1.438 | 1.000 | 1.193 |
| Relative Modulus | 1.145 | 1.113 | 1.105 | 1.105 | 1.000 |
| Relative Toughness | 1.000 | 1.736 | 1.692 | 1.038 | 1.443 |

TABLE 2

Relative Physical Properties of Composition A upon Addition of an Isocyanate

| Percent Isocyanate* | 0 | 0.5 | 1 | 1.5 | 2 |
|---|---|---|---|---|---|
| | Relative Tensile Strength | | | | |
| TDI | 1.181 | 1.183 | 1.341 | 1.371 | 1.181 |
| TMDI | 1.181 | 1.156 | 1.108 | 1.100 | 1.000 |
| IPDI | 1.181 | 1.162 | 1.224 | 1.174 | 1.134 |
| | Relative Modulus | | | | |
| TDI | 1.093 | 1.110 | 1.076 | 1.102 | 1.127 |
| TMDI | 1.093 | 1.102 | 1.000 | 1.059 | 1.068 |
| IPDI | 1.093 | 0.966 | 1.068 | 1.051 | 1.025 |
| | Relative Elongation | | | | |
| TDI | 1.723 | 1.70 | 2.135 | 2.250 | 2.554 |
| TMDI | 1.723 | 1.655 | 1.527 | 1.324 | 1.000 |
| IPDI | 1.723 | 1.932 | 1.757 | 1.723 | 1.507 |
| | Relative Viscosity | | | | |
| TDI | 1.000 | 1.294 | 1.671 | 1.897 | 1.968 |
| TMDI | 1.000 | 1.008 | 1.156 | 1.215 | 1.247 |
| IPDI | 1.000 | 1.021 | 1.026 | 1.215 | 1.273 |
| | Relative Toughness | | | | |
| TDI | 1.020 | 1.188 | 1.584 | 1.703 | 2.050 |
| TMDI | 1.020 | 1.129 | 0.990 | 0.911 | 0.614 |
| IPDI | 1.020 | 1.356 | 1.248 | 1.178 | 1.000 |

*Isocyanates used in this experiment were as follows: Toluene Diisocyanate (TDI); 2,2,4-Trimethyl Hexamethylene Diisocyanate (TMDI); and Isophorone Diisocyanate (IPDI). The indicated isocyanates were added to Composition A and stirred at 70° C. for 1.5 h, prior to curing and testing.

TABLE 3

Relative Physical Properties of Composition B upon Addition of Toluene Diisocyanate.

| | Percent TDI | | |
|---|---|---|---|
| | 0 | 1 | 1.5 |
| | Relative Tensile Strength | | |
| | 1.163 | 1.055 | 1.000 |
| | Relative Elongation | | |
| | 1.386 | 1.246 | 1.000 |
| | Relative Modulus | | |
| | 1.000 | 1.005 | 1.051 |

TABLE 3-continued

Relative Physical Properties of Composition B upon Addition of Toluene Diisocyanate.

| Percent TDI | | |
|---|---|---|
| 0 | 1 | 1.5 |
| Relative Viscosity | | |
| 1.000 | 1.437 | 1.553 |
| Relative Toughness | | |
| 1.471 | 1.245 | 1.000 |

Toluene diisocyanate (TDI) was added to Composition B then heated to 70° C. for 1.5 h, prior to curing and testing.

What is claimed is:

1. A radiation-curable coating comprising:
   (i) a component represented by the following formula (A):

$$A\text{-}X_1\text{-}A \quad (a)$$

wherein A represents a (meth)acrylate group; and
   $X_1$ represents at least one aromatic group or at least one alkoxy group; and
   (ii) a urethane (meth)acrylate component represented by the following formula (b):

$$X_2\text{-}I\text{-}X_2 \quad (b)$$

wherein I represents a diisocyanate residue and $X_2$ represents a residue of a component represented by the following formula (c):

$$A\text{-}X_1\text{-}OH \quad (c),$$

and wherein
   A is the same (meth)acrylate group as in formula (a) and $X_1$ is the same at least one aromatic group or the same at least one alkoxy group as in formula (a).

2. The composition of claim 1, wherein $X_1$ represents at least one aromatic group which is present as a residue of a phenolic group.

3. The composition of claim 1, wherein said formula (a) represents a bisphenol diacrylate.

4. The composition of claim 1, wherein said formula (a) represents a bisphenol A diacrylate.

5. The composition of claim 1, wherein said formula (a) represents an alkoxylated bisphenol A diacrylate.

6. The composition of claim 1, wherein $X_1$ has a molecular weight below 750 g/mol.

7. The composition of claim 1, wherein $X_1$ has a molecular weight below 500 g/mol.

8. The composition of claim 1, wherein I in formula (b) is a diisocyanate residue of an aromatic diisocyanate.

9. The composition of claim 1, wherein I in formula (b) is a diisocyanate residue of a toluene diisocyanate.

10. The composition of claim 1, further comprising a further oligomer prepared by reacting one or more polyols with one or more diisocyanates and one or more hydroxyalkylacrylates.

11. The composition according to claim 10, wherein said one or more polyols includes a polyether polyol.

12. The composition according to claim 10, wherein said one or more polyols includes a polyester polyol.

13. The composition of claim 1, wherein said composition comprises one or more photoinitiators.

14. The composition of claim 1, wherein said composition, after cure, has a glass transition temperature in the range −70° C.-130° C.

15. The composition of claim 1, wherein said composition, after cure, has a modulus of at least 400 MPa.

16. The composition of claim 1, wherein said composition comprises a colorant.

17. A product obtained at least in part by a process comprising curing the composition of claim 1.

18. An optical fiber matrix material, an optical fiber secondary coating, an optical fiber colored secondary coating, an optical fiber ink coating, or an optical fiber bundling material obtained by curing the composition of claim 1.

* * * * *